A. O. SLENTZ.
ALLIGATOR SHEARS.
APPLICATION FILED APR. 12, 1912.

1,122,319.

Patented Dec. 29, 1914
5 SHEETS—SHEET 1.

Witnesses

Inventor:
Albertus O. Slentz
Harry Frease
Attorney

A. O. SLENTZ.
ALLIGATOR SHEARS.
APPLICATION FILED APR. 12, 1912.

1,122,319.

Patented Dec. 29, 1914.
5 SHEETS—SHEET 4.

Witnesses:
R. Pohl
Ruth A. Miller

Inventor:
Albertus O Slentz
Harry Frease
Attorney

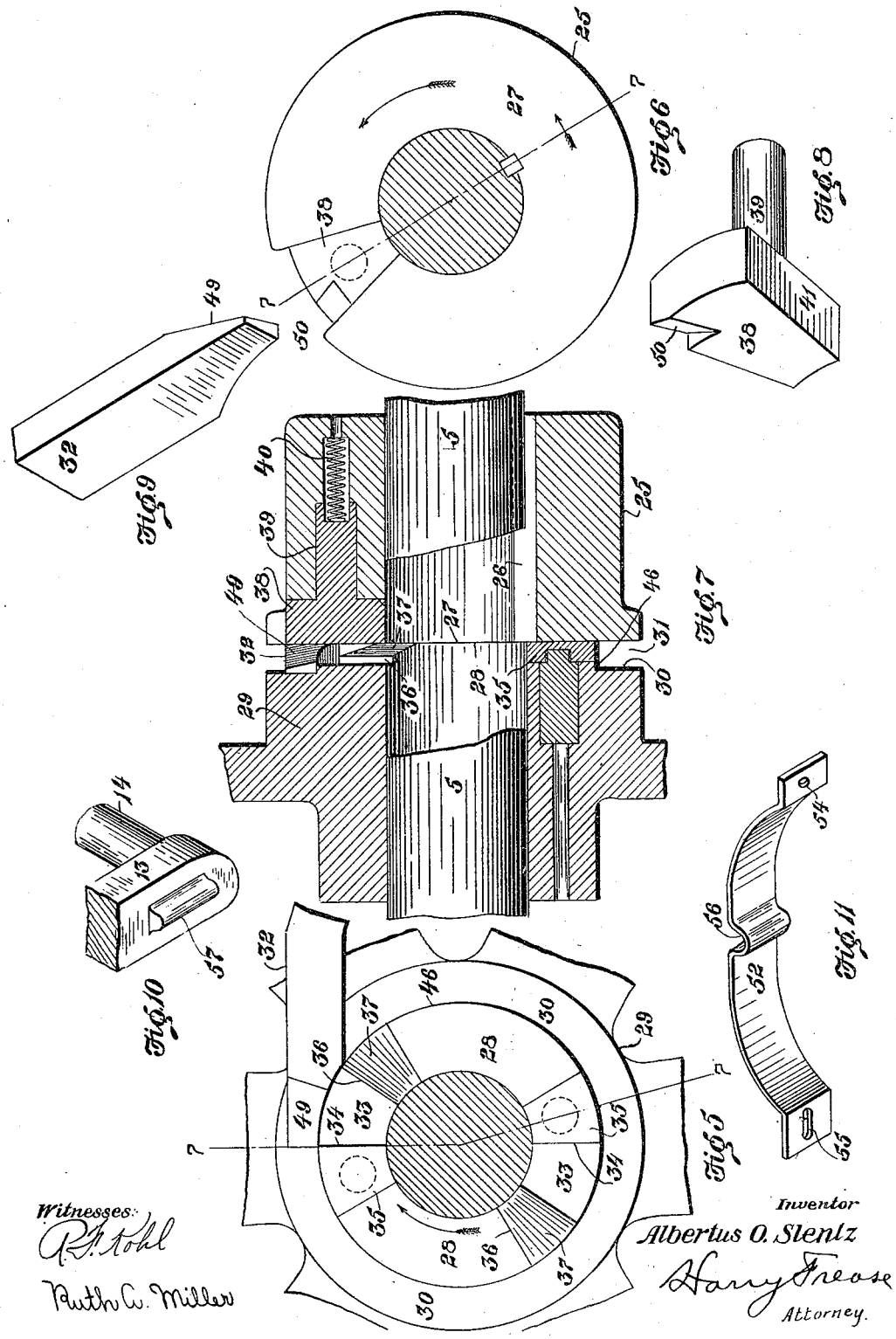

UNITED STATES PATENT OFFICE.

ALBERTUS O. SLENTZ, OF CANTON, OHIO, ASSIGNOR TO THE CANTON FOUNDRY AND MACHINE COMPANY, OF CANTON, OHIO, A CORPORATION OF OHIO.

ALLIGATOR-SHEARS.

1,122,319.　　　　　Specification of Letters Patent.　　Patented Dec. 29, 1914.

Application filed April 12, 1912. Serial No. 690,289.

*To all whom it may concern:*

Be it known that I, ALBERTUS O. SLENTZ, a citizen of the United States, residing at Canton, in the county of Stark and State of Ohio, have invented certain new and useful Improvements in Alligator-Shears, of which the following is a specification.

The invention relates to power shears for cutting metal bars and plates, and more particularly to that type of cutting machines colloquially called alligator shears; and the general object of the invention is to provide means for automatically stopping the shears in open position after a cut has been made.

In ponderous machines of this type, the heavy weight of the rear end of the shearing arm, with the added weight of the pitman and the cranks, has rendered it difficult to stop the machine in open position, because the momentum of the downward movement of these parts in opening the shears tends to cause the cranks to swing beyond the pendent position and thence upward again beyond the range of the clutch disengaging mechanism, thus resulting in a continuous operation of the shears. This difficulty is overcome, and ancillary advantages are attained, by providing means for equally balancing the excessive weight of the rear end of the shearing arm, the pitmen and the cranks, thus relieving the crank shaft from the weight of these parts; and by providing a friction spring for stopping the cranks in the proper position when the clutch is released and the shears open.

A preferred embodiment of the invention, thus set forth in general terms, is illustrated in the accompanying drawings, forming part hereof, in which—

Figure 1:
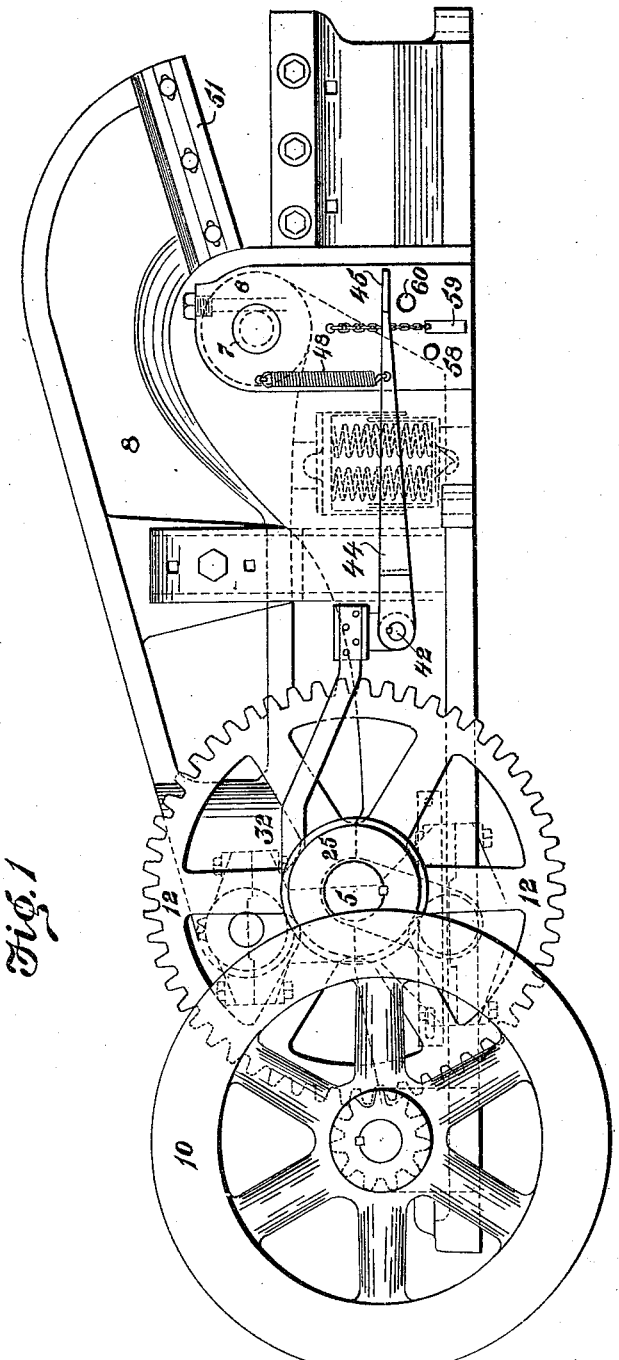
Figure 2:
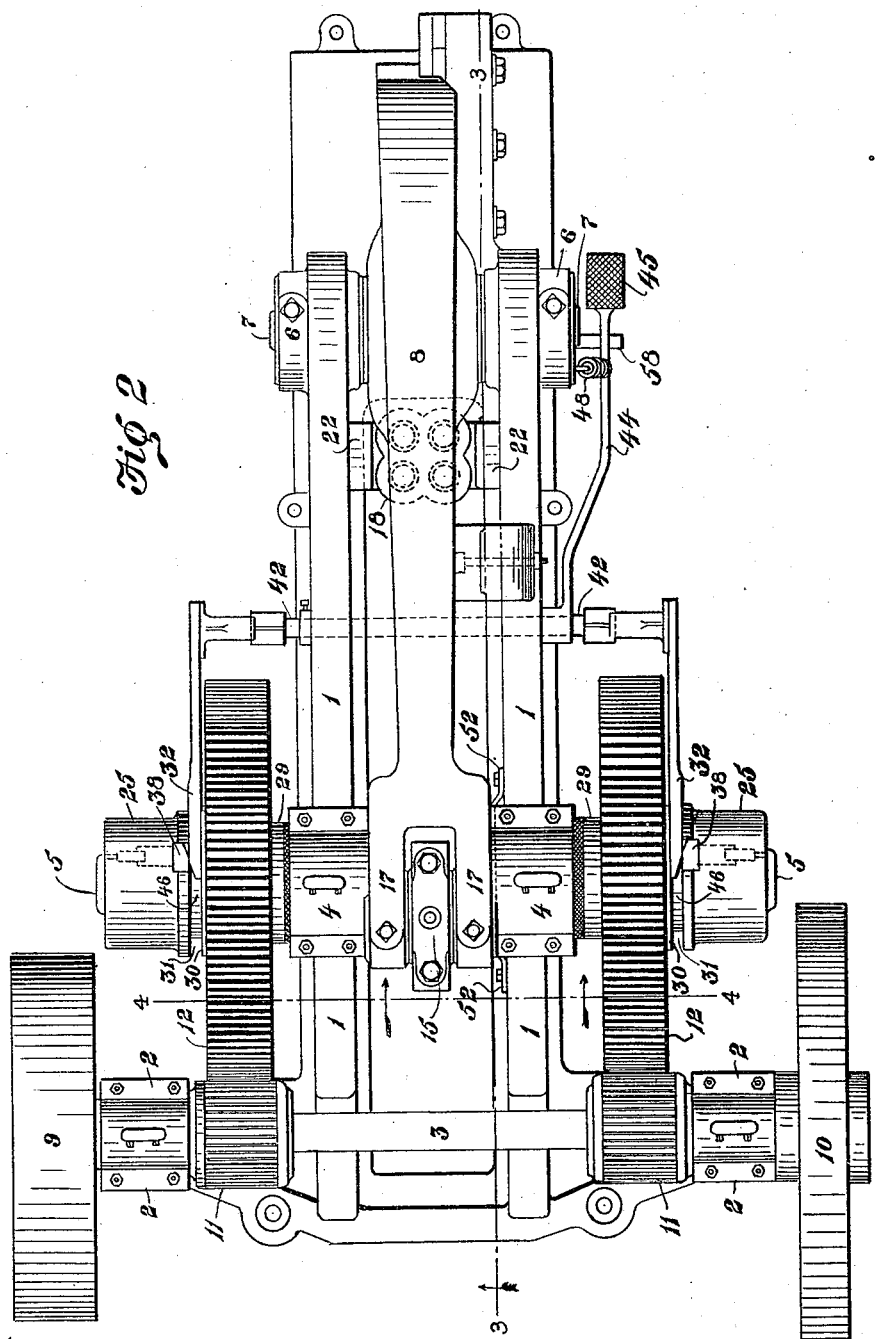
Figure 3:
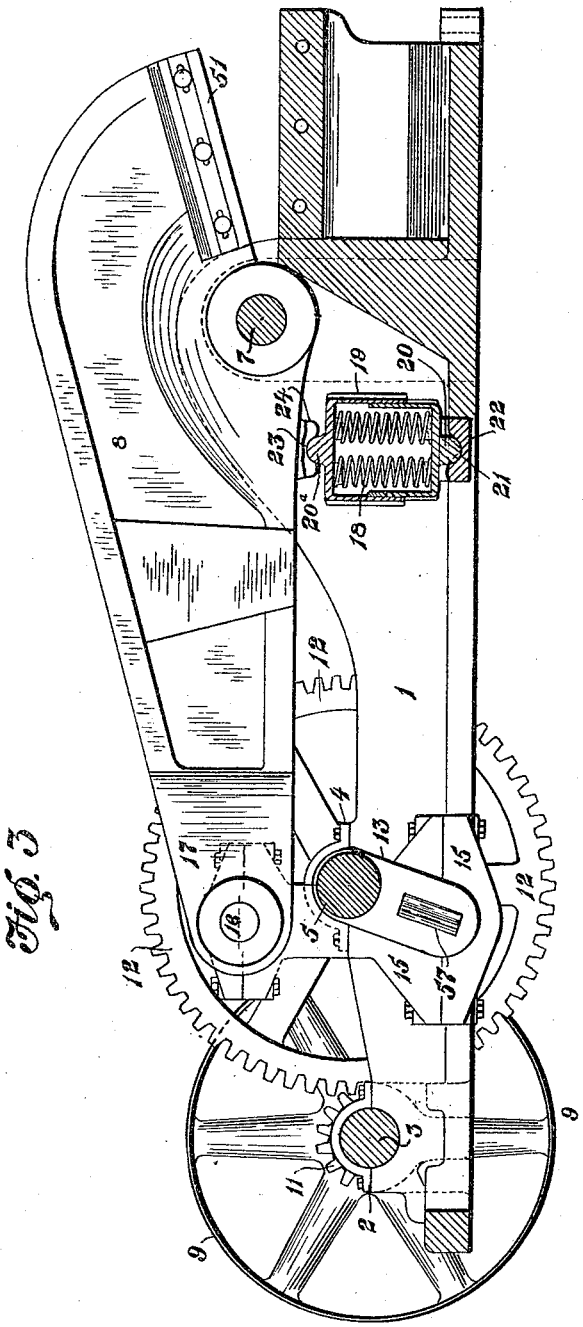
Figure 4:
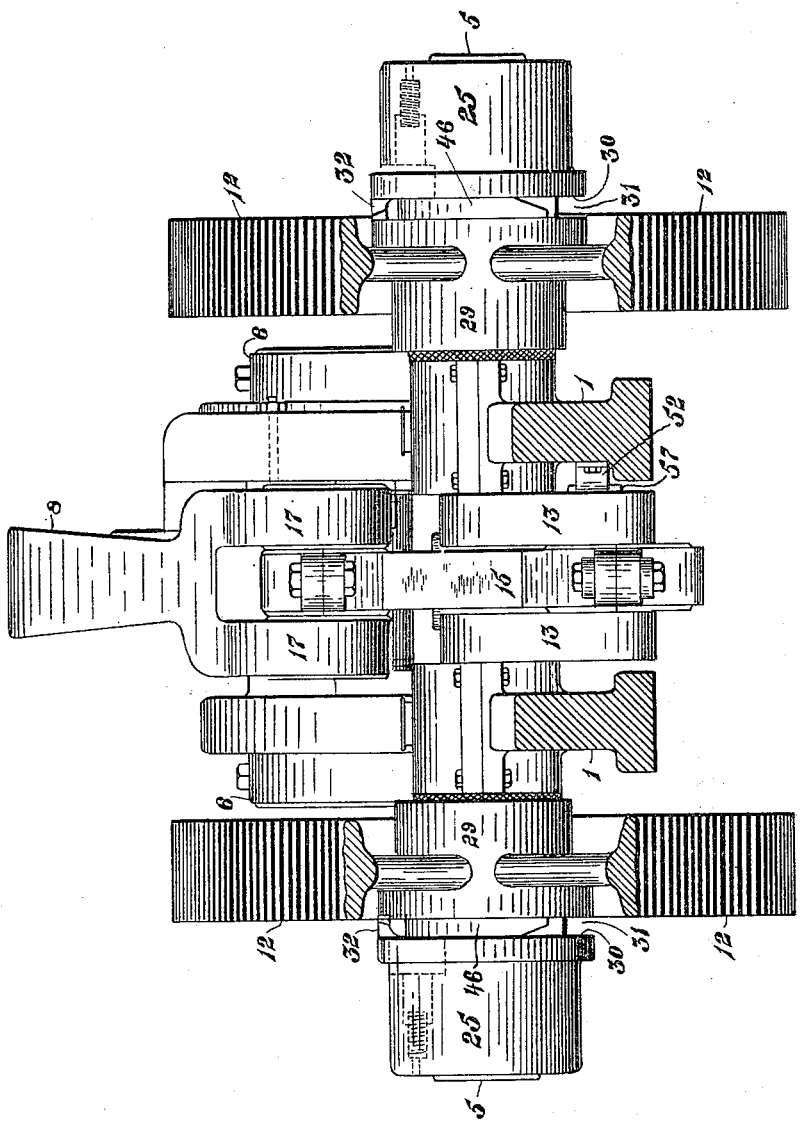

Figure 1 is a side elevation of the improved shearing machine; Fig. 2, a plan view thereof; Fig. 3, a longitudinal section thereof on line 3—3, Fig. 2, showing the balancing spring-case in median line section; Fig. 4, a cross section thereof on line 4—4, Fig. 2; Fig. 5, a fragmentary outer end view of one gear wheel hub, showing the clutch finger in releasing position; Fig. 6, an inner end view of one clutch head; Fig. 7, a fragmentary section showing the gear wheel hub on line 7—7, Fig. 5, and the clutch head on line 7—7, Fig. 6; Fig. 8, a detached perspective view of the clutch block; Fig. 9, a fragmentary perspective view of the end of the clutch finger; Fig. 10, a fragmentary perspective view of the end of one crank; and Fig. 11, a detached perspective view of the friction spring.

Similar numerals refer to similar parts throughout the drawings.

On the side members 1 of the base or frame of the shearing machine are formed or secured the journal bearings 2 for the driving shaft 3; the journal bearings 4 for the crank shaft 5 and the journal bearings 6 for the pivot shaft 7 of the shearing arm 8.

The driving pulley 9 is secured on one end of the driving shaft and the balance wheel 10 on the other end thereof, and the two cog pinions 11 are secured on the same shaft, preferably inside the journal bearings 2; and the cog gears 12 are rotatably mounted on the crank shaft 5 preferably outside the journal bearings 4; and it is evident that, when power is applied as by a belt to the driving pulley 9, the driving shaft and gear wheels are adapted for continuous operation.

The crank arms 13 are formed or secured on the crank shaft 5 and the outer ends thereof are yoked together by the wrist pin 14; on which wrist pin is journaled the lower end of the pitman 15, the upper end of which pitman is journaled on the pivot pin 16 extending between the side flanges 17 of the bifurcated rear end of the shearing arm 8; and it is evident that a rotation of the crank shaft 5 will cause an oscillation of the shearing arm 8 on its pivot shaft 7 for an operation of the shearing machine in the usual manner.

For the purpose of the present invention, the balancing springs 18 are provided and, as shown, four coil springs are arranged in the extensible case 19, the lower member of which is provided with the central rounded boss 20 which is seated in the corresponding socket 21 provided in the base bar 22; and the upper member of which case is provided with the central rounded boss 20ᵃ which is seated in the corresponding socket 23 formed in the depending lug 24 formed on the under side of the shearing arm in rear of the pivot shaft thereof; whereby the spring case will adapt itself freely to the oscillating movements of the shearing arm.

The strength of the springs is so adapted, and the parts are so located, proportioned and arranged, that the springs will equally balance that portion of the weight of the shearing arm in rear of its pivot shaft, which is in excess of the weight of the shearing arm in front of its pivot shaft, and also the weight of the pitman and the cranks, so that the shearing arm and its connected parts will operate without imposing any weight upon the crank shaft, and will normally remain at rest in all given positions.

The cylindric clutch heads 25 are secured, as by the keys 26, on the ends of the crank shaft, the inner ends 27 of which heads are in abutment with the outer ends 28 of the hubs 29 of the cog gear wheels 12. The annular rabbet 30 is provided in the peripheral portion of the outer end of each hub, thus forming an annular groove 31 in which the clutch finger 32 is adapted to operate.

One or more radial recesses 33 are provided in the end of each gear wheel hub, and, as shown in Fig. 5, two of such recesses are preferably provided in diametrically opposite relation; one side of each recess being provided with the square radial abutment 34 formed by the side of the hard steel clutch jaw 35 which is inlaid in the hub, while the other side of each recess is formed with the shallow shoulder 36 from which extends the beveled surface 37 which inclines annularly outward to the face of the outer end 28 of the hub.

The clutch block 38 and its stem 39 are located in corresponding recesses extending from the inner end of the clutch head and the compression spring 40 is provided in corresponding recesses in the body of the clutch head and the end of the block stem, the energy of which spring serves to press the clutch block inward toward the hub of the gear wheel, and, when not restrained, into one of the recesses thereof, whereby the forward face 34 of the clutch jaw (as the cog gear rotates in the operation of the machine, as shown by arrows in the drawing), abuts the side 41 of the clutch block and thereby rotates the crank shaft with the gear wheel.

The clutch fingers 32 are radially secured on the ends of the rock shaft 42 which extends through and is journaled in the side members 1 of the frame; to which rock shaft 42 is secured the forwardly extending arm 44, on the free end of which is provided the treadle 45 which is located on the operator's side of the machine adjacent to the forward end thereof, so as to be readily accessible to the operator.

The lower side of the forward end of each clutch finger 32 is concaved to conform to the periphery 46 of the gear wheel hub 29, being the base of the groove formed by the rabbet 30 in the rim of the hub, in which groove each finger is normally held by action of the expansion spring 48 extending upward from the treadle arm to the adjacent frame member 1.

The outer side of the forward end of each clutch finger is beveled to form the inclined face 49, which is furthermore slightly inclined downward and outward; and a correspondingly beveled notch 50 is provided at the forward outer corner in the inner side of the clutch block, so that, when the clutch finger is in normal position in the hub groove and the clutch block is rotating in abutment with the clutch jaw, the forward beveled end of the clutch finger, by operating in the beveled notch 50 in the clutch block, will wedge the same outward into the head recess and disengage the block from the jaw, and permit the gear wheel to rotate freely on the crank shaft.

The parts are preferably so proportioned and arranged that the clutch block will be fully disengaged from the clutch jaw when the cranks are slightly in rear of their pendent position and with the pitman in substantially vertical position, and the jaw 51 on the forward end of the shearing arm is in its upper open position, as shown in the several figures of the drawings. With this relation of the parts, and the excessive weight of the rear end of the shearing arm and the weight of the pitman and cranks being equally balanced by the springs 18, it is evident that the oscillation of the shearing arm will ordinarily stop when the clutch block is disengaged from the clutch jaw; because the mere weight of the pendent cranks, the friction of the several journal bearings, and the inertia of the shearing arm at the end of its oscillation, are generally sufficient to overcome the momentum of the rearward swinging of the cranks and the pitman.

For the purpose of more certainly timing the stopping of the cranks when the clutch is disengaged, the bow spring 52 is mounted on the inner side of one frame member in position to frictionally press against the side of the adjacent crank in its pendent position, as shown in Fig. 4, the frictional pressure of which spring serves to promptly and certainly stop the shearing mechanism when the crank shaft clutch is disengaged from the gear wheel. The friction spring is preferably secured to the frame by bolts 53 passed through the round aperture 54 in one end and the slotted aperture 55 in the other end, thereby permitting an endwise movement of the slotted end of the spring.

The depression 56 is preferably provided in the face of the friction spring 52, and the laterally beveled spud 57 is correspondingly provided on the abutting face of the crank, so that the crank will always be stopped at the same place by the entrance of the spud into the depression. But it will be understood that neither the use of the depression in the spring and the spud on the crank, nor the use of any friction spring at all, are essential to the other features of the invention.

In the operation of the machine as a stop-motion shear, the clutch fingers are normally held in the gear hub groove by action of the treadle arm spring, thus holding the clutch block out of engagement with the clutch jaws, as shown in Fig. 1, and permitting the driving shaft and gear wheels to rotate freely on the crank shaft, while the jaw of the shearing arm is in open position.

When the operator is ready to make a cut, the treadle is depressed by the foot, thus throwing the clutch fingers upward above the clutch block and permitting the same to be forced inward by the compression springs and to enter the first arriving recess and to engage the first arriving clutch jaw in the respective gear wheel hubs; whereby the crank shaft is rotated and the shearing arm is oscillated for the cutting operation.

After starting the shearing mechanism, the operator at once releases his foot from the treadle, whereupon the clutch fingers are again thrown downward into the hub grooves by action of the treadle spring, and, when the clutch block approaches the completion of the single rotation necessary for a single cutting operation of the shearing arm, the clutch fingers throw the clutch blocks out of engagement with the clutch jaws, whereupon the shearing mechanism is stopped by the inertia of its parts and the pressure of the friction spring against the side of the adjacent crank.

The permanent stop pin 58 is preferably provided on the side of the frame to limit the downward movement of the treadle arm, and the temporary stop pin 59 is preferably provided for entering into the corresponding aperture 60 in the side of the frame for holding the treadle arm downward against the action of its spring, and the clutch fingers upward out of the path of the clutch blocks, when it is desired to operate the shears with a continuous motion.

I claim:

1. A shearing machine including a base, a shearing arm fulcrumed on the base, means for oscillating the shearing arm, and means for equally balancing the shearing arm and pendent parts.

2. A shearing machine including a base, a shearing arm fulcrumed on the base, means for oscillating the shearing arm, and a spring for equally balancing the shearing arm and pendent parts.

3. A shearing machine including a base, a shearing arm fulcrumed on the base, a crank shaft journaled on the base, a pitman between the crank and the shearing arm, and means for equally balancing the shearing arm, the pitman and the cranks.

4. A shearing machine including a base, a shearing arm fulcrumed on the base, a crank shaft journaled on the base, a pitman between the crank and the shearing arm, and a spring for equally balancing the shearing arm, the pitman and the cranks.

5. A shearing machine including a base, a shearing arm fulcrumed on the base, a crank shaft journaled on the base, a pitman between the crank and the shearing arm, means for equally balancing the shearing arm, the pitman and the crank, and means for intermittently rotating the crank shaft.

6. A shearing machine including a base, a shearing arm fulcrumed on the base and having a shearing jaw on its forward end, a crank shaft journaled on the base, a pitman between the crank and the rear end of the shearing arm, and means for equally balancing the rear end of the shearing arm, the pitman and the crank.

7. A shearing machine including a base, a shearing arm fulcrumed on the base and having a shearing jaw on its forward end, a crank shaft journaled on the base, a pitman between the crank and the rear end of the shearing arm, and a spring for equally balancing the rear end of the shearing arm, the pitman and the crank.

8. A shearing machine including a base, a shearing arm fulcrumed on the base, a crank shaft journaled on the base, a pitman between the crank and the shearing arm, means for balancing the shearing arm, the pitman and the crank, and a spring frictionally pressing against the side of the crank for stopping it in pendent position.

9. A shearing machine including a base, a shearing arm fulcrumed on the base, a crank shaft journaled on the base, a pitman between the crank and the shearing arm, means for equally balancing the shearing arm, the pitman and the crank, a spring abutment on the base frictionally impinging the crank in pendent position, there being a depression in the face of the one and a corresponding spud on the face of the other for stopping the crank in a given position.

10. A shearing machine including a base, a shearing arm fulcrumed on the base, a crank shaft journaled on the base, a pitman between the crank and the shearing arm, means for equally balancing the shearing arm, the pitman and the crank, a driving gear adapted for continuous operation and having a clutch connection with the crank shaft, and means for first engaging and then automatically releasing the clutch for a stop-motion operation of the shearing arm.

11. A shearing machine including a base, a shearing arm fulcrumed on the base, a crank shaft journaled on the base, a pitman between the crank and the shearing arm, means for equally balancing the shearing arm, the pitman and the crank, a spring abutment on the base for frictionally impinging and stopping the crank in pendent position, a driving gear adapted for continuous operation and having a clutch connection with the crank shaft, and means for first engaging and then automatically releasing the clutch for a stop-motion operation of the shearing arm.

12. A shearing machine including a base, a shearing arm fulcrumed on the base, a shaft journaled on the base in operative connection with the shearing arm, a clutch head secured to and a gear wheel rotatable on the shaft, a jaw on the end of the wheel hub, a block in the clutch head, a spring acting to force the block in the path of the jaw, a rabbet-groove in the periphery of the hub, a clutch finger normally resting in the groove, the end of the finger and one edge of the block being correspondingly beveled, whereby the finger serves to throw the block from the path of the jaw.

13. A shearing machine including a base, a shearing arm fulcrumed on the base, a shaft journaled on the base in operative connection with the shearing arm, a clutch head secured to and a gear wheel rotatable on the shaft, a jaw on the end of the wheel hub, a block in the clutch head, a spring acting to force the block in the path of the jaw, a rabbet-groove in the periphery of the hub, a clutch finger normally resting in the groove, the end of the finger and one edge of the block being longitudinally beveled and laterally inclined, whereby the finger serves to throw the block from the path of the jaw.

14. A shearing machine including a base, a shearing arm fulcrumed on the base, a shaft journaled on the base in operative connection with the shearing arm, a clutch head secured to and a gear wheel rotatable on the shaft, a jaw on the end of the wheel hub, a block in the clutch head, a spring acting to force the block in the path of the jaw, a rabbet-groove in the periphery of the hub, a rock shaft journaled in the base having a pedal arm on one side and a clutch finger on the other side normally resting in the groove, the end of the finger and one edge of the block being correspondingly beveled, whereby the finger serves to throw the block from the path of the jaw.

15. A shearing machine including a base, a shearing arm fulcrumed on the base, a shaft journaled on the base in operative connection with the shearing arm, a clutch head secured to and a gear wheel rotatable on the shaft, a jaw on the end of the wheel hub, a block in the clutch head, a spring acting to force the block in the path of the jaw, a rabbet-groove in the periphery of the hub, a rock shaft journaled in the base having a pedal arm on one side and a clutch finger on the other side normally resting in the groove, the end of the finger and one edge of the block being correspondingly beveled, whereby the finger serves to throw the block from the path of the jaw, with means for holding the clutch finger out of the rabbet-groove.

ALBERTUS O. SLENTZ.

Witnesses:
RUTH A. MILLER,
ROY F. KOHL.